(12) United States Patent
Bhaskaran et al.

(10) Patent No.: US 9,232,226 B2
(45) Date of Patent: Jan. 5, 2016

(54) SYSTEMS AND METHODS FOR PERCEPTUALLY LOSSLESS VIDEO COMPRESSION

(75) Inventors: Vasudev Bhaskaran, Sunnyvale, CA (US); Nikhil Balram, Mountain View, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 1414 days.

(21) Appl. No.: 12/542,519

(22) Filed: Aug. 17, 2009

(65) Prior Publication Data

US 2010/0046628 A1 Feb. 25, 2010

Related U.S. Application Data

(60) Provisional application No. 61/090,106, filed on Aug. 19, 2008.

(51) Int. Cl.
| | |
|---|---|
| H04N 7/12 | (2006.01) |
| H04N 19/154 | (2014.01) |
| H04N 19/103 | (2014.01) |
| H04N 19/176 | (2014.01) |
| H04N 19/63 | (2014.01) |
| H04N 19/61 | (2014.01) |
| H04N 19/12 | (2014.01) |
| H04N 19/14 | (2014.01) |
| H04N 19/186 | (2014.01) |
| H04N 19/115 | (2014.01) |
| H04N 19/146 | (2014.01) |

(52) U.S. Cl.
CPC .......... *H04N 19/154* (2014.11); *H04N 19/103* (2014.11); *H04N 19/12* (2014.11); *H04N 19/14* (2014.11); *H04N 19/176* (2014.11); *H04N 19/186* (2014.11); *H04N 19/61* (2014.11); *H04N 19/63* (2014.11); *H04N 19/115* (2014.11); *H04N 19/146* (2014.11)

(58) Field of Classification Search
CPC .......... H04N 19/00036; H04N 19/103; H04N 19/186
USPC .............. 375/240.01, 240.04, 240.19, 240.24, 375/240.26; 382/232
See application file for complete search history.

(56) References Cited

U.S. PATENT DOCUMENTS

| | | | |
|---|---|---|---|
| 5,231,484 A * | 7/1993 | Gonzales et al. | ........ 375/240.04 |
| 2002/0001413 A1 | 1/2002 | Ratnakar | |
| 2003/0048943 A1 | 3/2003 | Ishikawa | |
| 2004/0017939 A1 | 1/2004 | Mehrotra | |

OTHER PUBLICATIONS

International Search Report and Written Opinion dated Dec. 19, 2009 from related/corresponding International PCT Patent Appl. No. PCT/US2009/054072.

* cited by examiner

*Primary Examiner* — Young Lee

(57) ABSTRACT

Systems and methods for compressing video data are provided. The method includes segmenting a video frame, selecting a coding mode, and encoding. The segmenting includes segmenting the video frame of the video data into a sequence of coding blocks. The selecting includes selecting the coding mode from a plurality of coding modes. The selecting of the coding mode is based on an allowable bit budget and occurs for each coding block. The encoding includes encoding each coding block based on the coding mode. The allowable bit budget varies according to a bit utilization of prior encoded coding blocks and varies such that the video frame does not exceed a specified compression ratio.

19 Claims, 7 Drawing Sheets

600

| w(20) | 0 0 0 1 1 0 1 1 0 0 1 |
| --- | --- |
| w(21) | 0 0 0 1 0 1 1 1 0 1 1 |
| w(36) | 0 0 0 1 1 0 1 0 0 1 0 |
| w(37) | 0 0 0 0 0 1 0 0 1 0 1 |
| w(52) | 0 0 0 0 1 1 0 1 1 1 0 |
| w(53) | 0 0 0 0 1 0 1 0 1 0 1<br>MSB to LSB |

Fig. 6

SYSTEMS AND METHODS FOR PERCEPTUALLY LOSSLESS VIDEO COMPRESSION

CROSS REFERENCE TO RELATED APPLICATIONS

This application claims the benefit of priority from U.S. Provisional Application No. 61/090,106, filed Aug. 19, 2008, entitled "A Perceptually Lossless Hybrid Video Codec Using Wavelet Transform" the entire disclosure of which is hereby incorporated herein by reference.

BACKGROUND

The present invention relates to video coding and decoding, and in particular, to systems and methods for perceptually lossless video compression.

High-quality digital video content is usually represented with 24 to 30 bits per pixel—8 or 10 bits for each of the three basic color components, namely Red (R), Green (G) and Blue (B) in the RGB color space or for luminance (Y) and the two chrominance components (Cb and Cr) in the YCbCr colorspace. In the uncompressed state, high-definition content at typical spatial (1920×1080) and temporal resolution (60 frames/sec) results in storage requirements around 62 Mbits per frame and a source data rate of 3.73 Gbps. These requirements may lead to large transmission time and memory requirements in broadcast and/or storage applications which need to support high-definition video content.

Compression is essential for the transmission and storage of such digital video content. Several compression standards and proprietary techniques (e.g. MPEG-2, H.264 and VC-1) have been developed and deployed to realize effective compression of such video content. These compression schemes strike a balance between transmission time and memory requirements on the one hand and image quality on the other. One class of compression schemes are referred to as "lossless" schemes wherein the compression method is such that the signal after it undergoes decompression is exactly the same signal on a bit-for-bit basis as the signal that was input to the compression process. The other class of techniques is commonly referred to as "lossy" schemes since the compression method discards information within the content that is deemed to be visually insignificant. Compression standards such as MPEG-2, H.264 fall into the latter category. Lossy techniques offer higher compression than lossless techniques due to their ability to approximate the signal by discarding certain components of the signal and reducing the redundancies in the compressed signal representation, whereas a lossless technique is only able to reduce redundancies in the signal representation.

The choice of a lossless or lossy scheme is application dependent and related to tradeoffs in memory size, transmission time and the target image quality that is to be achieved. Strictly speaking the desired image quality may not often be achievable if the memory requirement or the transmission time requirement has to be strictly met and often the designer specifies the memory and/or transmission time requirement and accepts the resulting image quality delivered by the codec. The inability to achieve the desired image quality may render many of the compression schemes unusable within some application scenarios that are display centric.

The problem with most of the currently available video compression methods is that they are designed for one type of data and generally do not work well for mixed mode content or data that does not fit well with the model of the source assumed by the compression method. MPEG-2 and H.264, for instance, assume that the source is natural video content and such a scheme may not work well if the source was a mix of natural video and graphics and/or text.

Another problem with these compression methods is that they are targeted primarily from the viewpoint of realizing efficient storage and transmission of natural video content, and thus the system is optimized for the high compression ratios that are needed for typical transmission schemes and/or typical storage devices for such video content such as DVD media. At this high compression ratio, the artifacts induced in the "lossy" coding process are often visible when displayed. Such compression schemes are agnostic to display quality—they consider only the transmission bandwidth or the storage capacity for realizing the desired compression.

Yet another problem associated with the deployment of such compression methods is that they are primarily tailored for application scenarios wherein it is assumed that there will be a plurality of decoders with only a few instances of encoding. This approach is well matched to broadcast applications and playback of stored content such as from a DVD player. Thus, these compression standards tend to have fairly complex encoding strategies and a simple decoding process. These schemes may not be suited for applications wherein both encoding and decoding resources may have to be available within the same system.

An application scenario where the compression scheme is incorporated within a display system framework imposes a different set of requirements on the compression scheme. Specifically, the primary constraint on the compression scheme is that it provides a perceptually lossless rendering of the content on the display. In this context the compression scheme is essentially transparent to the end user. In previous work related to compression schemes for display, the focus has been on using the decompressed representation of the compressed frame within the display controller's frame buffer for the purposes of deriving a control signal only, and the decompressed representation is never used for the purposes of display. Thus, these schemes did not strive to achieve a visually lossless representation for the decompressed signal. Furthermore, in this application scenario, the complete encode/decode processing chain should possess very low latency since this is a display application and thus needs to demonstrate real-time performance. Furthermore, in this application scenario, both encoding and decoding is needed within the same system. For example, a display module wherein the content maintained within a frame buffer of the display may be kept in compressed form and then decompressed at the time of rendering of the content. Within a display system capable of handling video content, often the display system has to support a wide range of spatial resolutions for the content. Most compression schemes that are based on processing of the content in a block by block manner tends to have a fixed geometry for the blocks which may be optimum for one resolution of the video content but may be suboptimum for another resolution of the incoming video content. Using suboptimum block sizes will not give the best image quality in the decoded video.

Another such application scenario is a networked display device wherein the content has to be compressed just enough to match the bandwidth requirements of the networking protocol only, and the display itself would decompress the content coming over the network interface and then render the content to the display. In a storage setup implemented within a display system, it may be cost effective to have a 16 Mbits memory module. Thus, a compression factor of 4-6 is sufficient for the high-definition video content. Note that H.264 and MPEG-2 strive for compression factors around 200:1, and at these compression factors, the artifacts introduced during the lossy coding process make the resulting displayed image not to be perceptually lossless. Using very low compression factors such as 4-6 within these methods make the scheme very inefficient and memory intensive. In such application scenarios, what is also needed are a simple encoder and decoder. Furthermore, the bandwidth constraint in such applications is not too severe compared with the case of storage or broadcast applications, and thus it may be feasible to realize compression of the content so that when decompressed and rendered on the display device, the image is deemed to be perceptually lossless.

Using the methods developed in the compression standards directly within these application scenarios would not provide the high image quality while at the same time provide a simple implementation capable of handling the mixed mode content that has to be supported by the display system.

Thus, it is desirable to improve video coding and decoding techniques. The present invention addresses these and other problems by providing systems and methods for perceptually lossless video compression.

SUMMARY

Embodiments of the present invention improve video compression. The invention includes a method for compressing video data. The method comprises segmenting a video frame, selecting a coding mode, and encoding. The segmenting includes segmenting the video frame of the video data into coding blocks. The selecting includes selecting the coding mode from a plurality of coding modes. The selecting is based on an allowable bit budget, and the coding mode occurs for each of the coding blocks. The encoding includes encoding each coding block based on the coding mode. The allowable bit budget varies according to a bit utilization of prior encoded coding blocks and varies such that the video frame maintains a specified compression ratio.

In one embodiment, the segmenting produces non-overlapping coding blocks.

In another embodiment, the selecting includes classifying each of the coding blocks as a synthetic image block or a natural image block.

In yet another embodiment, the encoding selectively utilizes the allowable bit budget according to the coding mode.

In one embodiment, the selecting includes evaluating whether a number of new color representations, not currently in a global pallet table of color representations, can be added to the global pallet table.

In one embodiment, the plurality of coding modes includes a global pallet mode and a local pallet mode. The selecting prefers the global pallet mode over the local pallet mode and the global pallet mode includes a global pallet table which is updated periodically according to a utilization of the global pallet table for prior encoded coding blocks.

In another embodiment, the selecting includes a parameter being compared to a number of new color representations not currently available in the global pallet table. The parameter sets a maximum number of color representations which can be added to the global pallet table in the encoding of each of the coding blocks.

In yet another embodiment, the global pallet table is reset after a number of coding blocks have been encoded utilizing the global pallet mode.

In one embodiment, the plurality of coding modes includes an A mode in which an entire coding block is not compressed when the allowable bit budget meets a threshold.

In another embodiment, the A mode is excluded as an allowable coding mode when the A mode has been utilized for a number of coding blocks of the video frame.

In one embodiment, the plurality of coding modes includes a wavelet transform mode in which each color plane of a coding block is encoded separately.

In another embodiment, the wavelet transform mode includes converting an RGB block into Y, Co, and Cg components, wherein an activity index is assigned to each component.

In yet another embodiment, the wavelet transform mode includes utilizing any bit savings from an encoding of a Co component, a Cg component, or both the Co and the Cg component to encode a Y component.

The invention also includes another method for encoding video data. The method comprises coding the video data according to a plurality of modes. Each mode is utilized according to characteristics of each coding block of the video data. The coding of the coding block of the video data utilizes a global pallet mode when a global pallet table has space to accommodate an additional number of color representations of the coding block that do not have a match in the global pallet table. The global pallet mode includes matching color representations of the coding block with a global pallet table. Additionally, the coding of the coding block utilizes a local pallet mode when the coding block cannot utilize the global pallet mode and the local pallet table has space to accommodate a number of unique color representations of the coding block. The local pallet mode includes coding the local pallet table with the unique color representations. Also, coding of the coding block utilizes an A mode such that no compression is performed, where the coding is performed when the coding block cannot utilize the local and the global mode, and an allowable bit budget for the coding block exceeds a threshold. The allowable bit budget varies such that the video data maintains a specified compression ratio.

In one embodiment, a size of the global pallet table and a size of the local pallet table correspond to the allowable bit budget.

In one embodiment, the method further comprises converting the coding block into a three color component colorspace. This occurs when the coding block cannot utilize the local mode, the global mode, or the A mode. A component of the three color components colorspace is coded. This coding comprises utilizing a grayscale mode when the component contains a number of unique grayshades that match a second threshold, and utilizing a wavelet mode when the coding block cannot utilize the grayscale mode. The wavelet mode includes a wavelet transform.

In another embodiment, each component of the three color component colorspace is coded sequentially. Any bit savings from a prior coding of a component may be utilized by a coding of any subsequent components.

The invention also includes a system. The system comprises a segmentation unit, a rate control unit, a selector, and an encoder. The segmentation unit segments a video frame of the video data into coding blocks. The rate control unit receives a specified compression ratio and provides an allowable bit budget for each coding block. The selector receives the coding blocks and the allowable bit budget and selects a coding mode for each coding block. The selector selects the coding mode from a plurality of coding modes. The encoder receives each coding block, the coding mode for each coding block, and the allowable bit budget. The encoder provides the number of bits utilized to encode each coding block to the rate control unit and processes a compressed bit stream. The allowable bit budget varies according to a bit utilization of prior encoded coding blocks. The allowable bit budget varies such that the video frame maintains a specified compression ratio.

Embodiments of the present invention may provide a compression technique for high-quality compression of mixed mode content such as video content with graphics or synthetic images with high frequency patterns, for example. This scheme may provide for a compression scheme which may be used within a display subsystem and not solely used in deriving a control signal as in typical display controllers. For example, the same decompressed signal may be used to provide a very high quality displayable image.

Additionally, embodiments of the present invention may provide a compression technique that has low computation complexity so that it may be incorporated within a display system. The compression technique may provide for very low latency in the encoding and decoding process and may have low memory requirements.

Some embodiments of the present invention may provide a block-based coding process that integrates the classification of the content within the block to the actual coding process applied to the block. This may also adapt the parameters of the coding process to render the decompressed content as perceptually lossless when displayed.

Another embodiment of the invention may provide a compression technique that has no temporal dependencies so as to reduce the memory requirements for the encoding scheme. In this way, the encoding method is intra-frame only and this may lead to a low latency coding method as well.

Embodiments of the invention may compress the content using a plurality of coding schemes. These may include exact representation based coding schemes such as global and local color palette schemes, for example. These coding schemes may also include a lossy wavelet transform coding scheme. In this embodiment, the best coding method on a block by block basis is utilized while maintaining a given compression rate for a video frame. Some embodiment of the invention may use a wavelet transform coding method that works on small block sizes which are typically 32×2 or 32×4 three color component pixel blocks. Additionally, this coding scheme offers high image quality while adhering to a fixed compression rate as specified by the rate controller function. Parameters of the coding scheme may be adjusted based on the use of perceptual quantization thresholds. Furthermore, the block geometry may be adapted to the content so that the 32×2 geometry may be easily changed to say 16×4 without increasing the codec's complexity significantly.

The present invention includes a compression method. This compression method may use very low complexity and extremely low latency due the use of small line buffers. Additionally, this method may target high-quality compression and use a combination of palette and transform based schemes to achieve the high quality compression for a wide variety of video content. With the low complexity and visually lossless compression capabilities within a display system, a codec may be used to support both the control function needed within the display system and the decompressed image having the quality level needed for the display.

In this scheme, the video content may be segmented into non-overlapping 32×2 or 32×4 blocks and each block is classified as being synthetic image class or natural image class. Synthetic image class data may be compressed without loss using a global or local color palette. The natural image class data may be further split into its three color component blocks and each color component block may be further distinguished into two classes having only few grayshades or having a large number of grayshades. If this color component block is found to contain few grayshades, then a simple grayscale palette based approach is used to represent this single colorplane block without loss. If, however, the block has a large number of grayshades a lossy wavelet transform based scheme may be employed for this block.

The block geometry may not have hard constraints and may alternately use a 32×2 blocksize, depending on the video content's resolution. The block geometry may be reconfigured to 16×4 or even 8×8. Within the wavelet coding stage, the coefficients are quantized using perceptually derived quantization thresholds when possible. Within the wavelet transform coder, a simple entropy coding scheme, that exploits grouping of the wavelet coefficients followed by bitplane coding, may be employed, and thus, avoids the complexity of conventional entropy coding schemes.

Within each of the block coding modes (e.g. global palette or local palette) as-is coding, intra color plane transform coding or intra color plane palette based coding modes exact control of the available bit budget enforced so that a target bit rate may be controlled. This compression technique may be primarily targeted to an application such as frame buffer compression within a display controller. The scheme may be flexible enough to be used within a networked display device as well as applications needing a simple memory compression scheme that requires guaranteed adherence to memory space usage.

Example embodiments of the present invention may include an encoding process utilizing a block-by-block basis which may use bit-rate control and selection of block coding modes. In one example embodiment, bit-rate control allocates a bit-budget for each block. For example, the overall bit budget may be dynamically distributed to the blocks such that each block is guaranteed to get a predetermined bit-budget such as, for example, at least 32×2×3×8×c (=1536c) bits. In this example, the block size is assumed to be 32×2, and each pixel value of each color component is represented in 8 bits and the desired compression factor is c (note that c is a value less than 1). In the block coding modes described below, the specified block bit-budget may be guaranteed not to be exceeded. Some bits may be saved while coding a block within its budget. While it is possible to have a complex bit-budget assignment strategy that distributes the budget according to block complexity and may further distribute the saved bits according to some sophisticated criteria, it is difficult to absolutely guarantee compression as well as quality using such schemes. For example, if the overall budget is distributed such that simple blocks get less than their uniform share (1536c bits) and complex blocks are allocated more than their uniform share, image quality will suffer near the end of the image if it consists of lots of complex blocks. One example embodiment of a simple bit-rate control strategy may be described as follows. If n is the number of blocks coded previously, and $B_n$ is the number of bits used thus far, then the next block is allocated a budget of $(1536c(n+1)-B_n)$ bits. Note that each block's budget may thus be guaranteed to be at least 1536c bits.

The following detailed description and accompanying drawings provide a better understanding of the nature and advantages of the present invention.

BRIEF DESCRIPTION OF THE DRAWINGS

FIG. 6 illustrates an example assignment of a bit length to represent all the coefficients within a group during the quantization and entropy coding stages within the W_T block coding mode.

DETAILED DESCRIPTION

Figure 1A:
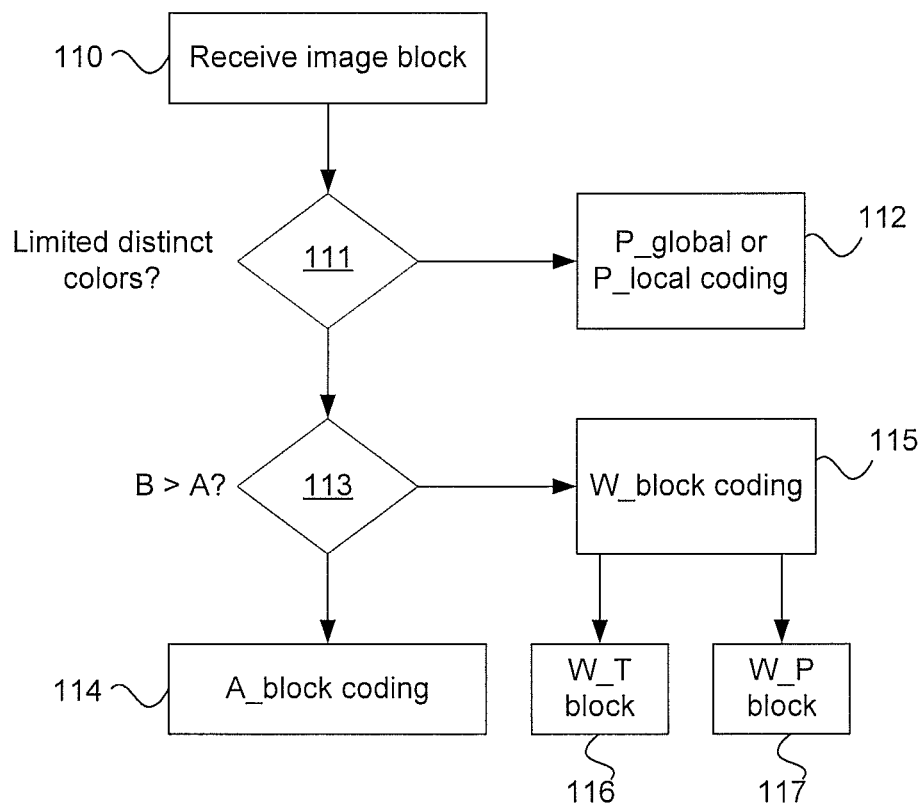
FIG. 1A illustrates an encoding process according to one embodiment of the present invention.

Described herein are systems and methods for perceptually lossless video compression. In one embodiment, the invention includes a perceptually lossless hybrid video codec using wavelet transform. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Introduction

In one embodiment, the present invention includes a method for compressing a frame of video that may be composed from a variety of content including graphics, synthetic image, text, and natural image content. The video frame may be decomposed into multiple non-overlapping 32×2 or 32×4 blocks of pixels wherein each pixel is represented with 3 color components (RGB or YCoCg or any other colorspace) and each component is 8 or 10 bits, for example. Each of these blocks within the frame may be then segmented into one of two classes, namely belonging to the natural image class or synthetic image class. This classification may be used to select among a plurality of coding methods including global color palette index based representation, local color palette based representation or an exact representation or wavelet transform based method. The selection of the coding method may be dictated by the various coding parameters specified by the user as well as the coding conditions such as the available bit budget for coding this block. The coded data may then be outputted as the compressed bit sequence for this block and any savings from the allocated bit budget for this block and the actual number of bits consumed for this block are then passed on to the next block. The process of classification and coding using the various methods mentioned above so as to conform to a bit apportionment strategy is repeated for the subsequent blocks in the sequence.

In one embodiment, multiple coding modes may be used to achieve uniformly high quality in video content that may comprise of natural imagery, synthetic imagery, or text and graphics. For example, embodiments may use five coding modes, where each block is classified and processed according to a global color palette mapping approach (herein referred to as P_global block coding method), a local color palette based mapping scheme (herein referred to as P_local block coding method), a unitary mapping approach (herein referred to as A_block coding method), or a hybrid spatial/wavelet-transform based scheme (herein referred to as W_block coding method). The W_block coding method itself is comprised of two additional methods namely W_P block coding method and W_T block coding method. The P_global block codec or P_local block codec work similarly using color palette table based coding and may be designed for synthetic regions of the image which do not have smoothly varying colors (e.g. text or graphics). The P block codecs (local or global), whether using a global color palette or local color palette, provide a lossless means of compression. Image blocks that cannot be classified as P blocks are candidates for being treated as A blocks or W blocks. Typically, blocks with smoothly varying (natural) pixel intensities may be classified as W_T blocks. However, within the W block category, it is possible to have blocks that when viewed as a 3 color component block might exhibit smoothly varying intensities, but when viewed as each color component independently, the block representing a single color component may have very few intensities. Blocks falling into the latter category may be coded in a manner similar to P_local block coding method. Thus, the W block category is treated as two sub categories. The first is W_P block, wherein one or more color component block representations have very few intensities. The second is W_T block, wherein the color components have smoothly varying intensities and thus are coded in a lossy manner using a discrete two-dimensional wavelet transform. Quantization of the wavelet transform coefficients in W_T block coding may be controlled taking into account the perceptual effect of quantization noise within each sub-band of the wavelet transform. If the video frame consists largely of P_local or P_global blocks, then the coding may be very efficient in the sense that $(1536c(n+1)-B_n)$ may be very high most of the time. In this case, some blocks may be coded without any compression, and are labeled as A-blocks. Table 1 below summarizes the coding techniques.

TABLE 1

| Coding Scheme | | Description |
|---|---|---|
| P_global | | Lossless |
| P_local | | Lossless |
| A_block | | As is - Lossy |
| W_block | W_P block | Wavelet transform - few intensities (Lossy) |
| | W_T block | Wavelet transform - smooth (Lossy) |

FIG. 1A illustrates the coding process. At 110, the image block is received. For P_global or P_local blocks, the encoder calculates a cutoff size, P (the relationship between c and P will become clear later) based on the compression factor c. If a block has no more than P distinct colors at 111, then it is labeled a P_global or P_local block and processed using either P_global or P_local coding at 112. The process of distinguishing between local and global palette modes will be described in more detail below. Alternatively, if an image block cannot be classified as a P_global or P_local block, and if the image block's available bit budget (B) exceeds A at 113 (e.g., B>A, where A is another cutoff parameter described below), and if no previous block has been labeled a W-block, then it is labeled an A_block and coded as-is at 114. If a block cannot be classified as a P_global or P_local block or an A_block, then it is labeled a W_block at 115. Within this category, the block is further subdivided into two categories, namely W_P block 117 or W_T block 116. For this subdivision, the color block is separated into three blocks with each block corresponding to one of the three color components. For example, if the original block is in RGB form, for the classification into W_P or W_T block mode, the RGB block may first be converted into another three color component colorspace (e.g., YCoCg), and the three blocks (namely the Y block, Co block and Cg block) are then analyzed further for being coded using the W_P block coding method or W_T block coding method. The details of this colorspace are not important for this invention since any colorspace that is efficient from a compression viewpoint may be used here. The motivation behind classifying the W block into two categories is as follows. For a variety of image content that may be processed by some compression systems, one or more colorplanes may have smoothly varying intensities but the remaining colorplanes may have only few unique intensities. This is typical of many video test patterns that are used in digital video display systems. Thus, the latter may be efficiently represented in a lossless manner using a grayscale valued palette, and the bit savings from this may be used for the other colorplanes that are treated as W_T blocks. For the W_T blocks, the complete wavelet transform based lossy coding approach is employed.

The coding method may be carried out using an encoder/decoder system. The encoder may comprise of the classifier and the various coding modes as well as a rate control engine to implement a bit-rate control strategy. The decoder may include decoding methods for the P_global, P_local block, A_block as well as the W_block (W_P and W_T coding methods). The decoding procedures reverse the functions performed in the encoding process so as to regenerate the pixel blocks from the compressed bit sequence. The encoder and decoder system may be configured separately to compress or decompress a digitized video frame according to the techniques described herein.

The coding method may also be implemented or embodied in a device such as a computer, a computer peripheral device, a computer component such as memory or processor, a storage device such as hard disk drive or DVD, a network device such as a router, or within a processing module such as the display controller within a LCD display system. Furthermore the coding method may be implemented in software or hardware or as a combination of both hardware and software embodiments for various tasks within the coding method.

Example Embodiments

Figure 1B:
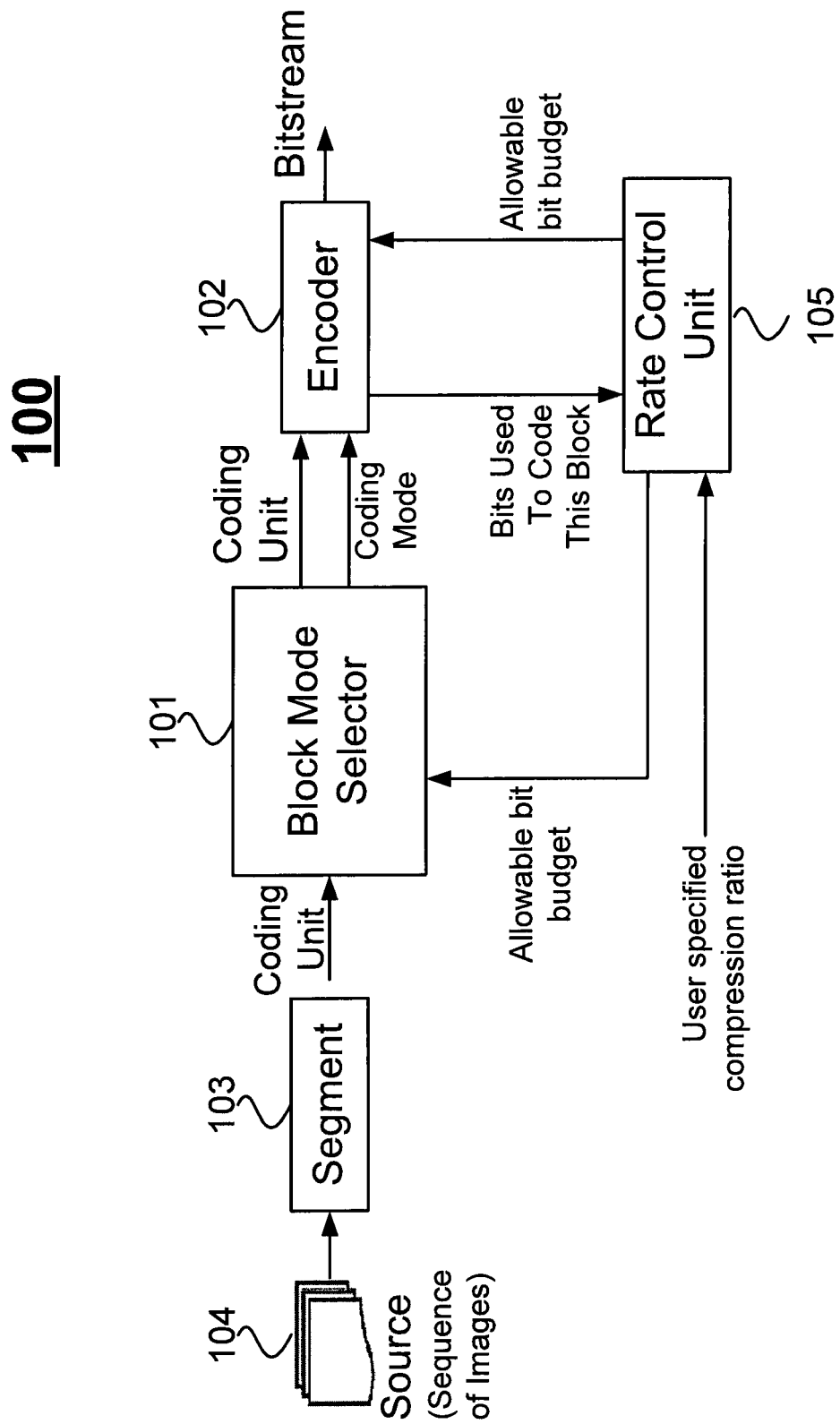
FIG. 1B illustrates an encoding system according to one embodiment of the present invention.

FIG. 1B illustrates an encoding system 100 according to one embodiment of the present invention. A segmentation unit 103 operates on each video frame in a video sequence 104 independently by first segmenting the video frame into a sequence of coding blocks. Each coding block may be a non overlapping block of 32×2 or 32×4 pixels and each pixel may have 3 color components and each component may be represented as 8 bits or as 10 bits, for example. Larger blocksizes do not give much higher compressibility while at the same time increases complexity whereas smaller block sizes have lower complexity but compressibility is also compromised. For compression applications working on high-definition video content as well as standard-definition video content (typically 720×480 resolutions), 32×2 or 32×4 may be a good compromise in terms of compressibility and complexity. Hereinafter the description of the method will be confined to the 32×2 blocksize (i.e., blocks) only and each pixel's color component represented with 8 bits, though it is understood that the coding parameters may be easily changed to support other blocksizes and other pixel bit depths as well. An overview of the encoding system 100 is depicted in FIG. 1.

In FIG. 1B, block mode selector 101 performs a block analysis function and classifies each block as being a synthetic image block (text, graphics) or a natural image block. Synthetic image blocks are characterized by having few unique pixel values within the block whereas natural image blocks are characterized by having smoothly varying pixel values. Motivation behind this classification is that in high quality video content there are regions within the video frame where there are only few colors, and thus such regions could benefit from a coding method that is optimized for this case.

The classified blocks are then processed through encoder 102 using one of five possible compression methods, namely the P_global block, P_local block, A_block, or W_block methods, where the W_block coding method is comprised of W_P block coding and W_T block coding as mentioned above. The choice of the specific coding method is dictated by the coding conditions prevalent at the time of the coding of the block.

Rate control unit 105 receives a user specified compression ratio and provides an allowable bit budget to selector 101 and encoder 102. Encoder 102 provides a bit utilization to rate control unit 105. The allowable bit budget corresponds to a compression ratio and a number of bits utilized in prior encoded coding blocks. The selector may utilize the allowable bit budget to change parameters of the selector which may influence which compression method is selected.

P_global block coding method uses a single color palette across several blocks whereas P_local block coding method uses a small color palette that is specific to the block being coded. It is likely when coding a block that is classified as a synthetic block that the colors representing this block are not all found within the global color palette. If so, this block is a candidate for P_local coding; however it may be coded in P-local coding method if specific coding conditions are met. If a block cannot be coded using P_global or P_local coding methods, depending on the coding conditions present at the time of coding this block, A_block coding method which is essentially a lossless coding method comprised of a simple copy operation of the encoder input to encoder output may be used. A_block coding is employed when there is enough bit savings realized from coding previous blocks (e.g., if the previous compression process has been very efficient). If on the other hand, coding conditions for A_block coding are not met at the time of coding this block, the lossless/lossy coding approach of W_block coding method is used. Here, a hybrid spatial/wavelet-transform based scheme employing palette based coding for grayscale values or efficient quantization and entropy coding of the wavelet coefficients is used to represent the compressed bit representation for this block.

Figure 2:
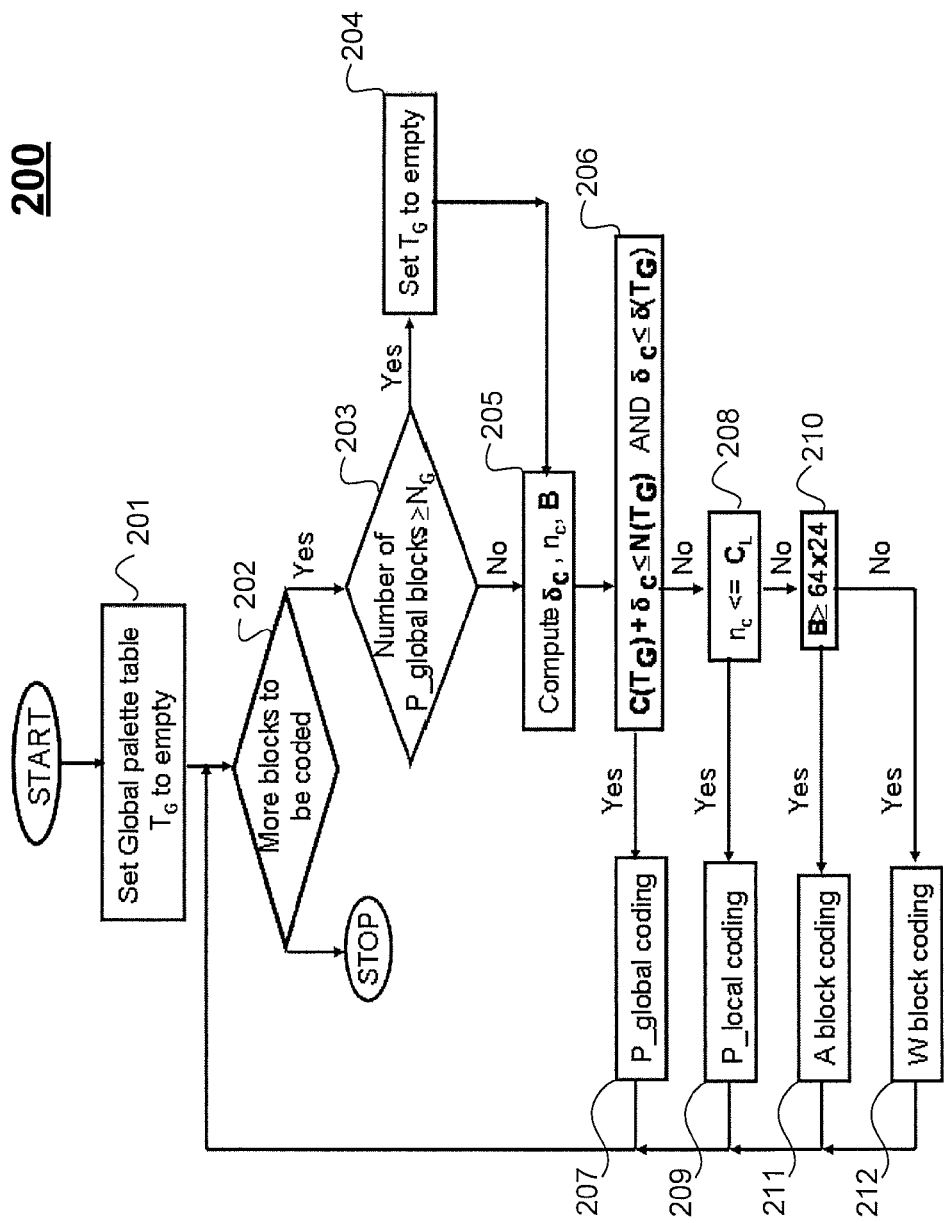
FIG. 2 illustrates an encoding process flow according to another embodiment of the present invention.

The compression scheme based on the system 100 depicted in FIG. 1 is described below with respect to the process flow 200 depicted in FIG. 2. Initially a color palette which is referred to in FIG. 2 as the global palette table $T_G$ is initialized to zero at 201. If there are additional blocks to be compressed (i.e., evaluated at 202), then the algorithm may first check (at 203) to see if the global palette table has been used a number of times in coding of previously occurring blocks by comparing the number of times the palette table $T_G$ has been used against a user defined threshold $N_G$. The rationale for this step is to allow for refresh of the global palette table since within a video frame it is likely that the global palette table's usage levels off and colors in the remaining blocks are quite different than the colors that are contained in $T_G$. Thus, if $T_G$ is not refreshed, $T_G$ may not be used in subsequent blocks, and the P_global coding method may not be invoked during the coding of the remaining blocks. To allow use of P_global coding method through the entire video frame, $T_G$ may be periodically refreshed (at 204) and this is accomplished by setting the parameter $N_G$.

If the count related to usage of $T_G$ does not exceed the parameter $N_G$, or if $T_G$ is refreshed, the process may compute the following compression parameters at 205:

$n_c$—the number of distinct colors in the block,
$\delta c$—the number of colors in the block that are not in $T_G$, and
B—the available bit budget for the block.

In order to determine if this block may be coded using the P_global coding method (at 207), the following two constraints may be required to be simultaneously satisfied (at 206):

$$C(T_G)+\delta c \leq N(T_G), \text{ and}$$

$$\delta c \leq \delta(T_G).$$

Here, $C(T_G)$ is the number of colors currently in $T_G$ prior to coding of this block, $N(T_G)$ is the maximum number of colors allowed for $T_G$ and $\delta(T_G)$ is the maximum number of new colors that are allowed to be added to $T_G$ if this block were to be coded using the P_global coding method. Since the available bit budget for this block is B and is known prior to the coding of this block, the relationship between $N(T_G)$ and B may be expressed as $$64\lceil \log_2 N(T_G) \rceil \leq B$$

where $\lceil x \rceil$ may be a ceiling function defined as the smallest integer not less than x. This equation ensures that if we represent each of the pixels within the block by an index in $T_G$ corresponding to the location of the entry in $T_G$ whose value matches the color of this pixel, then the number of bits needed for the representation of all of the pixels in the block will be within the available bit budget B. The constraint on $\delta c$ ensures that $T_G$ may not be quickly filled at the beginning of the coding process so that blocks coming later in the image also have an opportunity to be coded using the P_global coding method. If the overall compression ratio is 4:1, then $N(T_G)=64$ and $\delta(T_G)$ may be set to 8.

If the two constraints outlined above are met, then P_global coding method (at 207) may employed for this block. In this case, a unique 2 bit code (hereinafter referred to as the block mode type code) is transmitted for the block, indicating that this block is coded using the P_global coding method, followed by the indices in $T_G$ corresponding to each pixel in the block. There will be 64 such indices and each index is represented by $$\lceil \log_2 N(T_G) \rceil$$

bits. Note that initially $T_G$ is empty. Thus, as each new color is added to the table, since both encoder and decoder know what the current size of the table is prior to coding this block using the P_global coding method, the encoder has to transmit to the decoder a 24 bit pixel representing each new color added to this table when coding this block. When the table is full, and until such time that the table is reset again at 204, for all subsequent blocks coded using P_global coding method, table entries need not be transmitted to the decoder. Instead only the indices within the table need to be sent.

If the constraints for P_global coding mode are not met, the block may still be a synthetic image block (e.g. graphics or text), where not all of the colors, or none of the colors, in the block are found within $T_G$. If so, one may code the block using a local palette table referred to as $T_L$ and this palette table is sent to the decoder. In order to code this block using P_local coding method (at 209), it has to now satisfy the following constraint (at 208):

$$n_c \leq C_L,$$

where $C_L$ is the size of the local palette table and is a design parameter. An upper bound of $C_L$ may be computed as $$64\lceil \log_2 C_L \rceil + 24C_L \leq B$$

For a 4:1 compression ratio, $C_L=8$. If the constraint on $n_c$ is satisfied for the given $C_L$, then P_local coding method (at 209) is used.

In this case, the block may be transmitted as follows. The transmission may include a unique 2 bit code (block mode type code) indicating that this block is coded using the P_local coding method and a local color palette table $T_L$ with $C_L$ values (e.g., each value may be 24 bits). The transmission may further include the indices in $T_L$ corresponding to each pixel in the block. There may be 64 such indices, for example, and each index may be represented as follows:

$$\lceil \log_2 C_L \rceil \text{ bits (denote as } b \text{ bits).}$$

Since transmission of indices as-is for every block coded using P_Local coding method is wasteful of available bit budget, a simple run-length scheme may be used to realize some bit savings during the transmission of the palette indices. The current pixel's index may be coded using b bits. Then, if subsequent pixels have the same index (i.e. the same color), the run of such pixels that are of same value may be determined, and the length of this run may be coded. The specific coding rule may be as follows:

a) If run=0, send a prefix code=0 followed by b bits representing the index in $T_L$ corresponding to the color of this pixel.
  b) If run=1, implying that 1 pixel following the current pixel has same color, send a prefix code=10 followed by b bits representing the index in $T_L$ corresponding to the color of this pixel. It is easily seen that the average bits per pixel is (b+2)/2.
  c) If run is greater than 1 implying that 2 or more pixels following the current pixel have the same color, send a prefix code=11 followed by b bits representing the run value and this is followed by b bits representing the index. The average bits per pixel for this case is (2 b+2)/(3+runlength). Since the following example inequality applies:

$$\frac{2b+2}{3+runlength} \leq \frac{2b+2}{3}$$

for $C_L=8$ (b=3), the average bits per pixel never exceeds b, and thus the coded bit stream is guaranteed to never exceed the available bit budget B using this run-length code.

The same run-length coding procedure may be used for coding the indices in the P_global coding method (at 207) as well.

If the above-mentioned constraints for P_global (at 206) and P_local (at 208) are not met, it may be likely that the block is not a synthetic image block or that there are not sufficient bits in the bit budget to support P_global (at 207) or P_local (at 209). Therefore, one of three remaining coding methods may be employed for this block. If the available bit budget for this block is high (at 210), where blocks prior to this block have been efficiently represented using P_global or P_local mode of block coding, for example, then this block may be sent without any compression using the A_block coding method (at 211). For this coding method (at 211) to be invoked for this block, the following example constraint (at 210) may be met, B≥64×24. This constraint (at 210) may ensure each 24 bit pixel within this 32×2 block may be sent as-is, and the bits needed for the transmission are still within the available bit budget. A_block coding method (at 211) may output a unique 2 bit code, which identifies that the block is coded using A_block coding method, followed by the 24 bit representation for each pixel within the block, for example. To prevent using A_block coding too often, since it prevents bit savings to be kept aside for subsequent blocks, a user specified threshold may be used to reduce the frequency of usage of A_block coding. For example, the number of times A_block coding has been used may be counted, and if the count is equal to a user specified threshold, then the A_block coding may be disabled from being used again in the rest of the video frame.

If the block under consideration by the encoder is not coded as a P_global block or a P_local block or as A_block, then this block is coded in the W_block coding mode (at 212) using either the W_P coding method or the W_T coding method. In the coding methods described so far, the block has been coded taking into account the 3 color component values at each pixel jointly. W_block coding treats each colorplane separately in the coding process.

Figure 3:
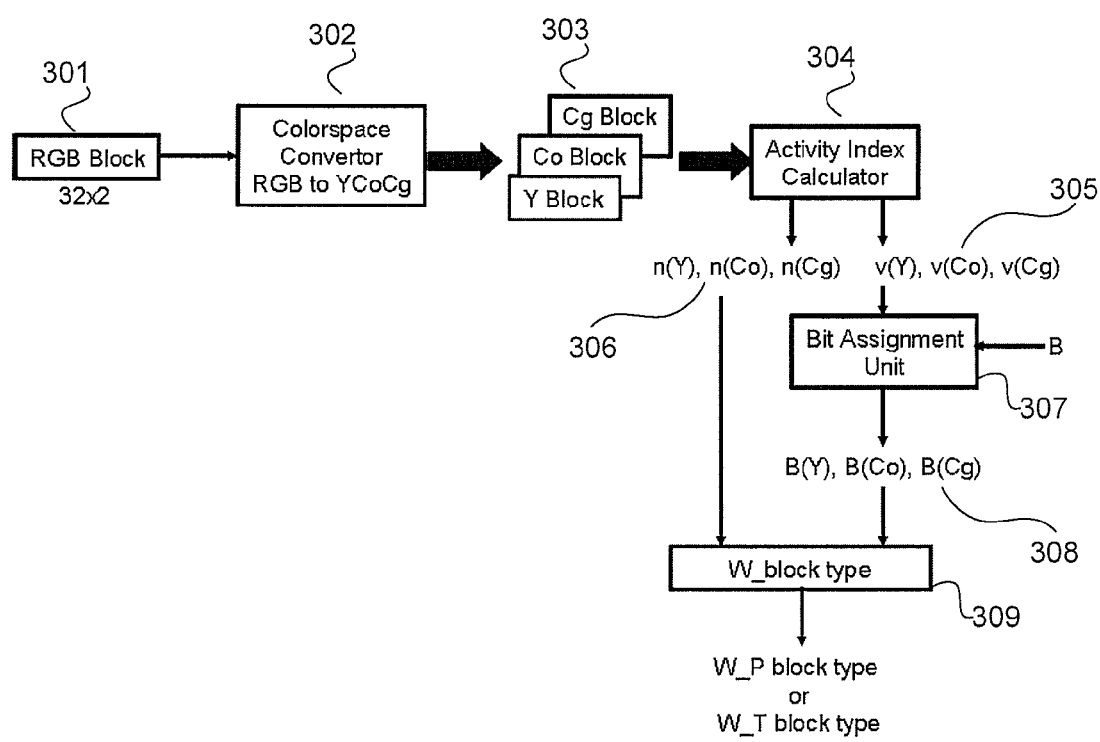
FIG. 3 illustrates a high-level process within the encoding in W_block coding mode according to an embodiment of the present invention.

FIG. 3 illustrates the first stage of a W_block coding method 300. In this example, a 32×2 block is first converted using a colorspace converter 302 from an RGB representation 301 into the well-known YCoCg colorspace representation. The received block is split into three blocks 303 with the same dimensions as the original RGB block and representing each of the color planes Y, Co, and Cg.

As mentioned earlier, the available bit budget B for this block may be computed as $1536c(n+1)-B_n$ bits. Here, n is the number of blocks coded previously, $B_n$ is the number of bits used thus far, and c is the desired compression ratio. The available bit budget B is then divided (at 307) among the three color component blocks based on an activity index computed (at 304) for each of the components 305, namely v(Y), v(Co) and v(Cg). In addition to computing the activity indices, for each block, the number of unique grayshades 306 within the block are also counted and denoted (at 304) as n(Y), n(Co) and n(Cg) as depicted in FIG. 3. If the block variance of Y, Co and Cg blocks are estimated as V(Y), V(Co) and V(Cg), then the activity index for each of the color component blocks 305 is computed as $v(Y)=V(Y)/[V(Y)+V(Co)+V(Cg)],$ $v(Co)=V(Co)/[V(Y)+V(Co)+V(Cg)],$ and $v(Cg)=V(Cg)/[V(Y)+V(Co)+V(Cg)].$ The available bit budget B is then apportioned to each of the color component blocks in proportion to their normalized activity index. Specifically, the minimum bit budgets available for coding Y, Co, and Cg blocks 308 are computed as $B(Y)=Bv(Y)/[v(Y)+v(Co)+v(Cg)],$ $B(Co)=Bv(Co)/[v(Y)+v(Co)+v(Cg)],$ and $B(Cg)=Bv(Cg)/[v(Y)+v(Co)+v(Cg)].$ In W_block coding (at 309), we first code Cg. Bit savings in coding this component is then used in coding the Co component, and any bit savings is then passed on to the coding of Y component. This ensures that Y component which contains most of the information of the original color block gets the most bits for its coding. The compressed representation for the RGB color block processed through W_block coding (at 309) will be of the form:

<2 bit code identifying W_block mode>
<compressed bitstream for Cg>
<compressed bitstream for Co>
<compressed bitstream for Y>.

The compressed bitstream representation for each of the color component blocks is created by first determining (at 309) if this block is efficiently compressed in spatial domain, denoted hereinafter as W_P coding mode, or in wavelet domain, denoted hereinafter as W_T coding mode. The motivation for this hybrid coding approach is that for many video frames it is likely the case that one or more color components within the block has very few grayshades and thus lends itself to being coded in a lossless manner using a spatial domain approach and the bit savings from this can then be used to code the other color components of this RGB block so as to realize very high image quality.

We describe the W_P and W_T coding modes with respect to one of the color components, such as the Y color component. The same procedure may be applied to the other color components Co and Cg. For the available bit budget, B(Y), for the Y component block, we compute a threshold T(y) such that the following constraint is satisfied $$64\lceil \log_2 T(y) \rceil + 8 \lceil \log_2 T(y) \rceil \le B(Y)$$

Then, if n(Y)≤T(y), this block is coded in W_P coding mode; here, n(Y) is the number of unique grayshades of the block representing this color component Y. In W_P coding, the following example processing steps may be performed:

i) Output a '0' to indicate this block is coded in the W_P coding mode. This mode bit is in addition to the 2 bit code preceding it which indicates that W_block coding is used for this block.

ii) Construct a table of grayshades representing the n(Y) unique grayshades within this block. Output this table using $8\lceil \log_2 T(y) \rceil$ bits.

iii) For each pixel in the block, find its matching value in the above-mentioned table of grayshades and record its index.

iv) After all the indices have been recorded, use the run-length code described in the P_local coding method to code the indices of this block.

Steps i), ii) and iv) comprise the compressed bitstream for this block when it is coded in the W_P coding mode. Note that this is a lossless form of coding this color component block's pixel values.

Figure 4:
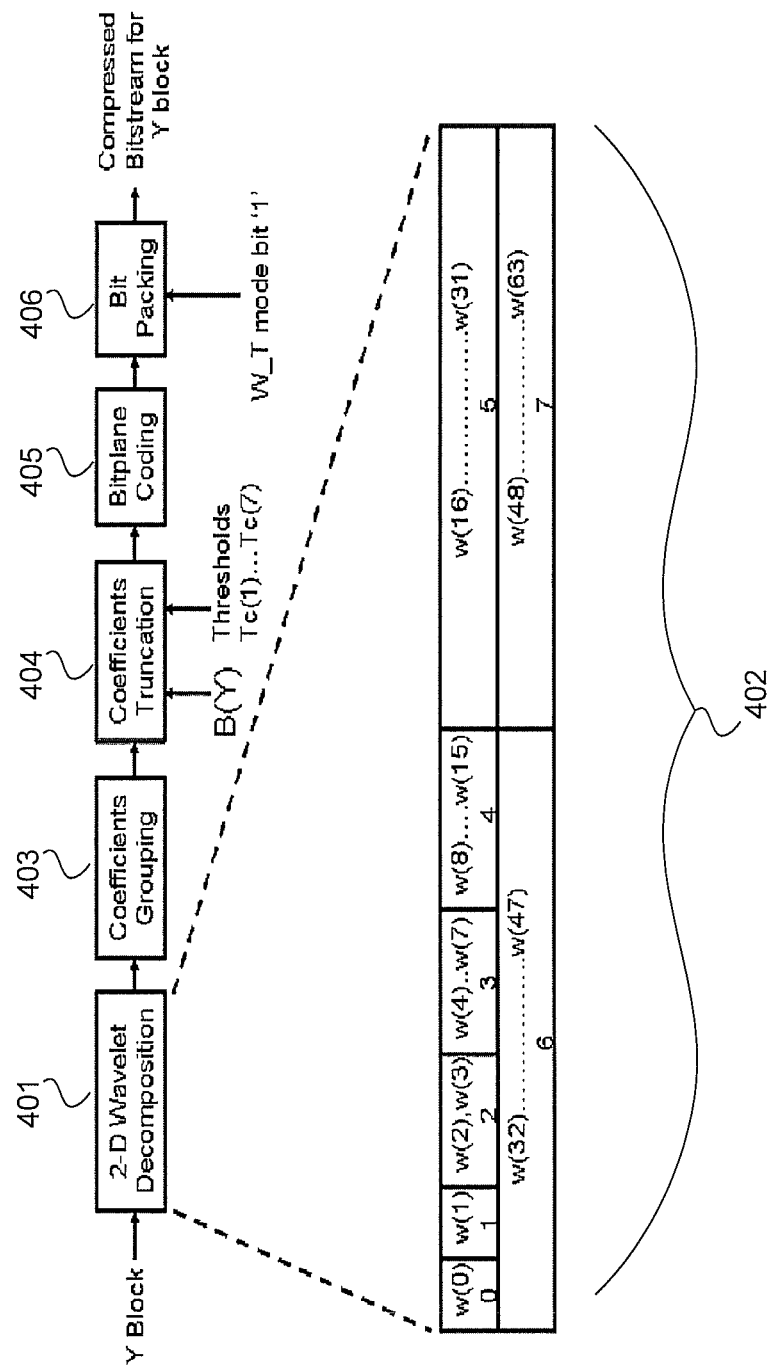
FIG. 4 illustrates the wavelet decomposition and resulting subbands from the wavelet transform function in the encoder of W_T block coding mode.

If the constraint n(Y)≤T(y) is not satisfied, this block will be coded in the W_T coding mode. This is the only mode within the codec that can result in a lossy representation in the decompressed video. The processing flow in an example W_T coding mode 400 is depicted in FIG. 4. In this example, the basic unit of processing for the 2-D wavelet transform is set to 32×2 blocks. For example, having a smaller block height may lead to reduced line buffer storage, which may lower the overall complexity of the codec. Increasing the block width beyond 32 may not yield substantial improvement in image quality for high-definition video content while at the same time can increase the complexity. Thus 32×2 provided a good tradeoff of complexity against resulting image quality in this example.

Figure 5:
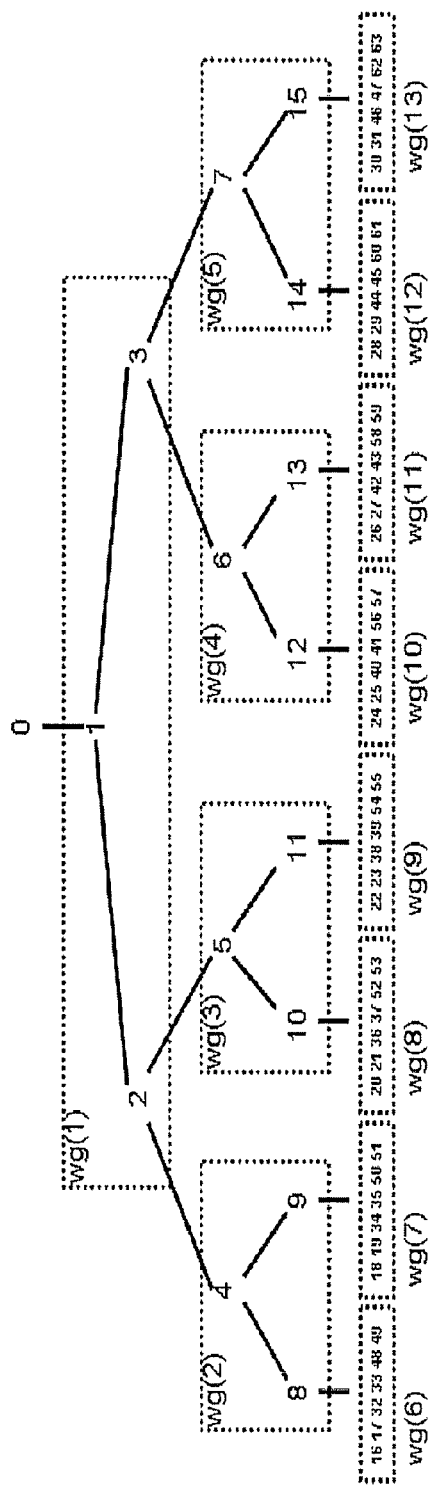
FIG. 5 illustrates a grouping of the wavelet coefficients used in the quantization and entropy coding stages within the W_T block coding mode.

In W_T coding mode, the following processing steps may be performed:

i) Output a '1' to indicate this block is coded in W_T coding mode. This mode bit is in addition to the 2 bit code preceding it which indicates that W_block coding is used for this block.

ii) The block undergoes a 2-D wavelet decomposition (at 401). The coefficients w(0), w(1), ..., w(63) from the 2-D wavelet decomposition process are numbered in raster order and these coefficients and the resulting subband structure of eight subbands 402 is as shown in FIG. 4.
iii) As illustrated in FIG. 5, the coefficients within the subbands 500 are then grouped (at 403) and all coefficients within a group are treated the same way in the coefficient truncation stage (at 404) and subsequent entropy coding.
iv) Each group is coded using the same number of bits per coefficient in the coefficient truncation stage 404, and this number itself is efficiently determined so that the total number of bits used for a block is no more than the given budget B(Y). Furthermore, the truncation is done by taking into account a visibility threshold of distortion that is induced when a coefficient is truncated.
v) A simple entropy coding scheme or bitplane encoding (at 405) is employed wherein the truncated coefficients in the compressed bitstream are represented using a sign, magnitude representation. In one embodiment, a bitplane encoding scheme is used wherein the value to be entropy coded is represented by its sign and magnitude. The sign bit is sent and then the bit pattern comprising the magnitude is encoded up to some number of bits as allowed by the available bit budget. This technique may require no look-up tables of codes, and turns out to be more efficient from a rate-distortion point of view than complex zero-tree encoding schemes.
vi) At 406, the bits are packed to provide the output compressed bit stream for Y block. The bit packing includes a "1" bit to indicate that this block utilized a wavelet compression mode. During bit packing, the entropy coded bit pattern for each of the coefficients is appended to the bit pattern of the next coefficient and so on.

For the 2-D wavelet decomposition, a combination of a Haar filter and the 2-6 filter may be used, where the analysis section is a 2 tap filter and the synthesis section is a 6 tap filter. The Haar filter has the following tap weights:

$$\left(\frac{1}{\sqrt{2}}, \pm \frac{1}{\sqrt{2}}\right)$$

The 2-6 filter has the following tap weights for the analysis section and synthesis section:

$$\left(\frac{1}{\sqrt{2}}, \frac{1}{\sqrt{2}}\right)$$

And $$\left(-\frac{1}{8\sqrt{2}}, \frac{1}{8\sqrt{2}}, \frac{1}{\sqrt{2}}, \frac{1}{\sqrt{2}}, \frac{1}{8\sqrt{2}}, -\frac{1}{8\sqrt{2}}\right)$$

The motivation for using the Haar filter in this example is that given the block height is fairly small, more complex filters may not provide any benefit.

Given a sequence of length 2N (e.g., $s_0, s_1, s_2, \ldots, s_{2N-1}$), the filtering operation using the Haar filter denoted as $WF_1$ results in two sequences sL and sH, each of length N as follows:

$sL_i = s_{2i} + s_{2i+1}$, $i=0,1,\ldots,N-1$, and $sH_i = s_{2i} - s_{2i+1}$, $i=0, 1,\ldots,N-1$.

Likewise, using the 2-6 filter denoted as $WF_2$ results in two sequences each of length N (sL: low-pass coefficients set and sH: high-pass coefficients set) as follows:

$sL_i = s_{2i} + s_{2i+1}$, $i=0,1,\ldots,N-1$, and $sH_i = -(s_{2i-2} + s_{2i-1}) + 8(s_{2i} - s_{2i+1}) + (s_{2i+2} + s_{2i+3})$, $I=0, 1,\ldots,N-1$.

In this example, the √2 factor is not shown since this scaling term may be absorbed within the quantization process applied when truncating the wavelet coefficients.

For an example 32×2 block, the subband decomposition achieved by applying sequentially the above-mentioned 1-D filters $WF_1$ and $WF_2$ may be as follows.
i) Filter each of the 32 columns of image data using $WF_1$ (this sequence length is 2 for this filter).
ii) Apply $WF_2$ horizontally to each of the two rows of 32 of elements resulting from Step 1.
iii) Apply $WF_2$ horizontally to the 16 low-pass coefficients in top row.
iv) Apply $WF_2$ horizontally to the 8 low-pass coefficients in top row.
v) Apply $WF_2$ horizontally to the 4 low-pass coefficients in top row.
vi) Apply $WF_1$ horizontally to the 2 low-pass coefficients in top row.

At the end of this process, we obtain the 64 wavelet coefficients w(0), w(1), ..., w(63) shown at 402 in FIG. 4. It is easily seen that the maximum value of wavelet coefficient will not exceed 11 bits for 8-bit valued pixels. This is because for 8 bit valued pixels, and a block size of 32×2, the largest wavelet coefficient requires 14 bits, but when the √2 factor is included in the wavelet decomposition, the coefficients are downscaled by at least a factor of 8, resulting in at most 11 bits per wavelet coefficient. In the lossy coding approach adopted in W_T coding mode, the coefficients are further quantized to achieve the target bit budget B(Y) for this block.

The 64 wavelet coefficients form a tree with each level of the tree corresponding to the details of a particular resolution. Coefficient w(0) is the mean value of the 32×2 block and thus may be coded exactly using 11 bits for 8-bit valued pixels. In most wavelet coders, a tree of wavelet coefficients is coded on a coefficient by coefficient basis by comparing the coefficient value against a set of thresholds. The thresholds are typically powers of two, and efficiencies are derived in this form of coding using special codes to identify sub trees of insignificant coefficients and thus avoiding encoding the entire sub tree. A coefficient value is deemed to be insignificant if it is below the threshold for that level of the sub tree. Such a scheme is efficient for very high compression ratios where there is a high likelihood of a collection of sub trees comprising insignificant coefficients which need not be transmitted, or it could be the case that several coefficients within a sub tree may be deemed insignificant and only a few coefficients at the root of such a sub tree may be deemed significant. For such a 2-D wavelet tree structure for the block, given the bit budget B(Y), the encoder may have to assign Bs bits for encoding the tree structure and Bc bits for representing the significant coefficients within the tree structure. The Bs bits may represent a means of identifying the location of the most significant bit for each coefficient, and remaining bits Bc represent the bits following the most significant bit for each coefficient. Note that this form of encoding is a simple bit plane coding scheme and does not use conventional entropy coding methods such as huffman coding of the coefficients since the bit budget constraints are harder to meet with variable length coding schemes such as the huffman coder.

Such a scheme works very well at medium to high compression ratios but for the specific wavelet decomposition employed in this embodiment and the lower compression ratio applications targeted in this embodiment, a simpler scheme may be found for encoding the wavelet coefficients. At the lower compression ratio, Bs may be too high, since many of the wavelet coefficient tree structure may contain significant coefficients. On the other hand from an image quality viewpoint it may be preferable to assign more bits to Bc, since the goal is to realize visually lossless compression with this embodiment. The approach adopted in this example embodiment is to group together wavelet coefficients that have similar statistics and treat each coefficient within the group in the same manner in terms of quantization of the coefficient and subsequent coding of the quantized representation. This minimizes the number of bits, Bs, and improves the use of the remaining bits to represent the coefficients.

The coefficient grouping function in W_P block coding depicted in FIG. 4 is shown in detail in FIG. 5. The 64 coefficients are grouped into 13 groups and a DC term, w(0). In order to encode the coefficients within a group, the largest location of the most significant '1' within a group is used to determine the number of bits used for that group. This concept is illustrated in table 600 of FIG. 6, which uses a bit plane representation for group wg(8) of FIG. 5. The actual bit plane values are for illustrative purposes only. Note that the largest value for the most significant bit position within this group occurs at bit position 8. For example, coefficients w(20), w(21), w(36) have a MSB at bit position 8, but w(37) has its MSB at the bit position 6. Thus, in the example of FIG. 6, the bit planes will be shifted such that all coefficients have their most significant bit at bit position 8. Thus the number of bits needed to represent the bit length of each coefficient within the group is reduced to a single number instead of six distinct values that have to be communicated to the decoder. Normalizing the most significant bit position within a group by itself does not achieve the desired bit budget in this embodiment. The wavelet coefficients within each group have to be suitably quantized so that the available bit budget is not exceeded.

The encoder uses the bit budget B(y) to compute a value r, which is the number of right shifts it will apply to each of the 63 coefficients (i.e., all except the DC term).

$$\gamma(n, r) = \begin{cases} l(|w(n)|) - r, & l(|w(n)|) \geq r \\ 0, & l(|w(n)|) < r \end{cases}$$

Where, $l(|w(n)|)$ is the bit length of the $n^{th}$ wavelet coefficient (excluding the sign bit) prior to quantization and $\gamma(n,r)$ is the bit length of this coefficient after quantization (note that quantization of the wavelet coefficients in this embodiment is a simple right shift operation). For coefficient group wg(g), let $\gamma_g(g,r)$ denote the maximum value of $\gamma(n,r)$ over all coefficients w(n) belonging to group wg(g); note that g=1, 2, ..., 13 to designate 13 groups as shown in FIG. 5. The encoding procedure codes each of the wavelet coefficients w(n) in group wg(g) using $\gamma_g(g,r)$ bits for the value (|w(n)|>>r) and an additional bit for the sign if this value is non-zero. Note that >>r implies shifting to the right by r positions.

Decoder needs to know r as well as each wg(g)'s $\gamma_g(g,r)$ in order to reconstruct the coded coefficient values from the bitstream representing the encoded bit planes for each group. For 8 bit pixel data, r will not exceed 11 and thus requires only 4 bits for its coding. Furthermore, $\gamma_g(g,r)$ may be efficiently represented with at most 4 bits but further efficiencies in its representation may be obtained by taking into account the specific value of r as well as g. The actual bit requirements are shown in Table 2 for each wavelet coefficient index 'n'.

TABLE 2

Bits needed to code $\gamma_g$ (g, r)

| Index n | Shift amount r | Bits needed to code $\gamma_g$ (g, r) |
|---|---|---|
| 1, 2, 3 | 0, 1, 2, 3 | 4 |
| 1, 2, 3 | 4, 5, 6, 7 | 3 |
| 1, 2, 3 | 8, 9 | 2 |
| 1, 2, 3 | 10 | 1 |
| 1, 2, 3 | 11 | 0 |
| 4, 8, 9 | 0, 1, 2 | 4 |
| 4, 8, 9 | 3, 4, 5, 6 | 3 |
| 4, 8, 9 | 7, 8 | 2 |
| 4, 8, 9 | 9 | 1 |
| 4, 8, 9 | 10, 11 | 0 |
| 16, 17, ..., 63 | 0, 1 | 4 |
| 16, 17, ..., 63 | 2, 3, 4, 5 | 3 |
| 16, 17, ..., 63 | 6, 7 | 2 |
| 16, 17, ..., 63 | 8 | 1 |
| 16, 17, ..., 63 | 9, 10, 11 | 0 |

The shift by r positions may be combined with the shift done to obtain w(n) from the wavelet decomposition function since the previously mentioned $\sqrt{2}$ scale factor was not accounted for in the coefficient values of the subband filters used in wavelet decomposition. Let n(s) represent the amount of shift needed for subband number s; the actual subband numbers associated with each wavelet coefficient is as shown in FIG. 3. Then, in the quantization step, the value w(n) will be right shifted by r+n(s) positions, where s is the subband number for coefficient n. The n(s) values are listed in Table 3. Before shifting, we always add the value $2^{r+n(s)-1}$ for rounding.

TABLE 3

Shifts needed in each subband to obtain scaled w(n).

| Subband number, s | Shift amount, n(s) |
|---|---|
| 0 | 3 |
| 1 | 3 |
| 2 | 5 |
| 3 | 5 |
| 4 | 4 |
| 5 | 4 |
| 6 | 1 |
| 7 | 4 |

The final step is to determine the value of r needed to meet the available bit budget B(Y) for this block. The goal is to find the smallest r, since the role of r is to truncate the wavelet coefficient values and truncation is the sole source of loss in W_T mode coding. The steps involved in determining the best 'r' for this block are as follows:

1. Start with r = 0. Set bits used counter say Bu = 0.
2. For each group g = 1,...,13
   a) examine all the coefficients within this group, to determine $\gamma_g(g,r)$
   b) Update Bu using the bits needed to code $\gamma_g(g,r)$ as per Table 1.
   c) For each coefficient within the group,
      i) If bit precision of coefficient w(n) is greater than $\gamma_g(g,r)$, w(n) is assumed to be quantized to zero but will still be represented by $\gamma_g(g,r)$ zero-valued bits. Otherwise, w(n) needs to be shifted so that the final bit precision is $\gamma_g(g,r)$ bits.
      ii) If w(n) is not equal to zero, indicate the sign of w(n) with a '1' or '0' for + or –.
      iii) Update Bu accounting for the bits needed to represent the magnitude of the coefficient and, if needed, the bit needed to represent the sign bit as well.
3. After all coefficients in all groups have been examined, find bits needed to code this block (e.g., Bu for the current value of 'r').
4. If Bu > B(Y), repeat steps 2 and 3 by incrementing r by 1 at each repetition.

At the end of this process, the smallest 'r' for this block has been found such that the bits needed for this block do not exceed the available bit budget B(Y). Now the coded representation for this block will comprise of the following components:
i) A 4 bit number for 'r'
ii) For each group, $\gamma_g(g,r)$ values represented with bit precision as per Table 2.
iii) The quantized representation for each coefficient w(n), i.e. w(n) represented with $\gamma_g(g,r)$ bits and (if needed) a sign bit. Note that for each 'n', it is known a priori which group 'g' this coefficient belongs to—this is shown in FIG. 5.

In W_T coding, the decoder reverses the steps applied by the encoder. The block of coefficients is extracted from the bit stream knowing 'r', $\gamma_g(g,r)$ and the bitstream representing the coefficients. Note that decoder has a replica of Table 1 and thus knows for the given 'r', exactly how many bits are used to represent $\gamma_g(g,r)$. The w(n)'s are then processed through the inverse transformation of the wavelet decomposition process to recover the pixel approximations. It is assumed that prior to decoding the block using the W_T block decoder, it has been determined by reading the two bit W_block type code and the 1 bit following this code that this block was coded in the W_T block mode.

Decoder operations may follow the steps shown below:

1. Decode DC value by reading 11 bits from the input stream. This represents w(0).
2. Extract 'r' by reading the next 4 bits from the bitstream.
3. Extract the bit lengths $\gamma_g(g,r)$ used to code the coefficients in each of the 13 groups.
4. Extract the coefficients w(n) as follows:
For each n = 1 to 63
   If $\gamma_g(g,r) > 0$ then
      a) Get $\gamma_g(g,r)$ bits say, b.
      b) Left shift this bit pattern by r positions to get w(n).
      c) If w(n) is not zero-valued, read the next bit from the input bitstream which will indicate if w(n) is positive or negative valued.
Repeat the process for the next coefficient.
5. At this stage, the w(n) values have been found. Next, the process of wavelet decomposition has to be undone to compute the 64 pixel values for this block from the sequence of w(n). This is essentially the inverse transform process and is described below.

The inverse transform may be described using two kinds of synthesis filters, one for the Haar filter $WF_1^{-1}$, and one for the 2-6 filter $WF_2^{-1}$ (these filters are the inverse of the filters $WF_1$ and $WF_2$ described in the encoding process for W_T coding mode). The implementation of these synthesis filters may be described in terms of mapping a sequence of inputs of length 2N to a sequence of outputs of length 2N. The input sequence consists of N low-pass coefficients $\{sL_0, sL_1, \ldots, sL_{N-1}\}$, and N high pass coefficients, $\{sH_0, sH_1, \ldots, sH_{N-1}\}$. The output sequence consists of the reconstructed values, $s_0, s_1, s_2, \ldots, s_{2N-1}$.

$WF_1^{-1}$ computes the output sequences values as follows:

$$s_{2i}=sL_i+sH_i, i=0,\ldots,N-1,$$

$$s_{2i+1}=sL_i-sH_i, i=0,\ldots,N-1.$$

$WF_2^{-1}$ computes the output sequence s values as follows:

$$s_{2i}=sL_{i-1}-sL_{i+1}+8(sL_i+sH_i), i=0,\ldots,N-1,$$

$$s_{2i+1}=-(sL_{i-1}-sL_{i+1})+8(sL_i-sH_i), i=0,\ldots,N-1.$$

The inverse transformation uses the synthesis filters $WF_1^{-1}$ and $WF_2^{-1}$, and several scaling steps to recover the pixel block. The inverse transform process for the entire 32×2 block follows these steps:
1. Apply $WF_1^{-1}$ to $\{w(0), w(1)\}$ to compute $\{w_1(0), w_1(1)\}$.
2. Apply $WF_2^{-1}$ to $\{w_1(0), w_1(1), w(2), w(3)\}$ to compute $\{w_2(0), w_2(1), w_2(2), w_2(3)\}$.
3. Apply $WF_2^{-1}$ to $\{w_2(0), w_2(1), w_2(2), w_2(3), w(4)<<4, \ldots, w(7)<<4\}$ to compute $\{w_3(0), w_3(1), \ldots, w_3(7)\}$. Here <<4 implies left-shift the value by 4 positions.
4. Apply $WF_2^{-1}$ to $\{w_3(0), w_3(1), \ldots, w_3(7), w(8)<<7, \ldots, w(15)<<7\}$ to compute $\{w_4(0), w_4(1), \ldots, w_4(15)\}$.
5. Apply $WF_2^{-1}$ to $\{w_4(0), w_4(1), \ldots, w_4(15), w(16)<<11, \ldots, w(31)<<11\}$ to compute $\{w_5(0), w_5(1), \ldots, w_5(31)\}$.
6. Apply $WF_2^{-1}$ to $\{w(32), \ldots, w(63)\}$ to compute $\{w_5(32), w_5(33), \ldots, w_5(63)\}$. Left shift by 11 positions each element of the sequence $\{w_5(32), w_5(33), \ldots, w_5(63)\}$.
7. Let first column of a 2-D array comprise the first 32 elements of the sequence $\{w_5(0), w_5(1), \ldots, w_5(31)\}$ and the second column consist of the remaining 32 elements namely $\{w_5(32), w_5(33), \ldots, w_5(63)\}$. Apply $WF_1^{-1}$ on each column of this 2-D array to compute the 64 elements $\{w_6(0), w_6(1), \ldots, w_6(63)\}$.

8. Add $2^{15}-1$ to each of the elements $\{w_6(0), w_6(1), \ldots, w_6(63)\}$ and right shift these values by 15 positions.

9. The resulting set of 64 elements is now the reconstructed pixel values obtained through the decoding process of W_T coding mode. In the description of the compression algorithm it was assumed that the input pixels are 8-bit valued. Thus the output vector $\{w_6(0), w_6(1), \ldots, w_6(63)\}$ may be clamped in the range [0,255] and the resulting 32×2 block of decoded pixel values for the individual colorplane block is obtained in the following mapping:

$$p(i,j)=w_6(32i+j), i=0,1 \text{ and } j=0,1,\ldots,31.$$

The decoder arithmetic may be carried out exactly using 32-bit arithmetic, without any overflow/underflow.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for compressing video data, the method comprising:

segmenting a video frame of the video data into coding blocks; and for each coding block of the coding blocks, selecting, based on an allowable bit budget, a respective coding mode from a plurality of coding modes, wherein the allowable bit budget (i) is a number of bits allocated for encoding the coding block, each coding block of the coding blocks being guaranteed an allocation of at least n bits, n being based on a block size of the coding blocks and a number of bits required to represent each pixel value of each color component included in the coding blocks, and (ii) is determined based on a number of bits previously utilized in encoding another coding block of the coding blocks, the allowable bit budget for the coding block being equal to $((n*(m+1))-B_m)$ bits, where m is a number of the coding blocks previously encoded, and $B_m$ is a number of bits utilized in encoding the m coding blocks, and encoding the coding block based on the coding mode respectively selected for the coding block, wherein the allowable bit budget among the coding blocks varies such that the video frame maintains a specified compression ratio.

2. The method of claim 1, wherein segmenting the video frame of the video data produces non-overlapping coding blocks.

3. The method of claim 1, wherein selecting, based on the allowable bit budget, the respective coding mode from the plurality of coding modes includes classifying each of the coding blocks as a synthetic image block or a natural image block.

4. The method of claim 1, wherein encoding the coding block based on the coding mode respectively selected for the coding block selectively utilizes the allowable bit budget according to the coding mode.

5. The method of claim 1, wherein selecting, based on the allowable bit budget, the respective coding mode from the plurality of coding modes includes evaluating whether a number of new color representations, not currently in a global pallet table of color representations, can be added to the global pallet table.

6. The method of claim 1, wherein the plurality of coding modes includes a global pallet mode and a local pallet mode, wherein selecting, based on the allowable bit budget, the respective coding mode from the plurality of coding modes prefers the global pallet mode over the local pallet mode, and wherein the global pallet mode includes a global pallet table which is updated according to a utilization of the global pallet table for prior encoded coding blocks.

7. The method of claim 6, wherein said selecting, based on the allowable bit budget, the respective coding mode from the plurality of coding modes includes a parameter being compared to a number of new color representations not currently available in the global pallet table, wherein the parameter sets a maximum number of color representations which can be added to the global pallet table in the encoding of each of the coding blocks.

8. The method of claim 6, wherein the global pallet table is reset after a number of coding blocks have been encoded utilizing the global pallet mode.

9. The method of claim 1, wherein the plurality of coding modes includes an A mode in which an entire coding block is not compressed when the allowable bit budget meets a threshold.

10. The method of claim 9, wherein the A mode is excluded as an allowable coding mode when the A mode has been utilized for a number of coding blocks of the video frame.

11. The method of claim 1 wherein the plurality of coding modes includes a wavelet transform mode in which each color plane of a coding block is encoded separately.

12. The method of claim 11, wherein the wavelet transform mode includes utilizing any bit savings from an encoding of a Co component, a Cg component, or both the Co and the Cg component to encode a Y component.

13. The method of claim 1, further comprising:

determining the allowable bit budget for each of the coding blocks, wherein the allowable bit budget is determined for each coding block on a block-by-block basis.

14. The method of claim 1, further comprising:

varying the allowable bit budget such that the video frame maintains the specified compression ratio, wherein the specified compression ratio is specified by a user.

15. The method of claim 1, further comprising:

determining the allowable bit budget for encoding the coding block based on the number of bits previously utilized in encoding the another coding block, wherein the another coding block is a last coding block that is encoded prior to the encoding of the coding block.

16. A system comprising:

a segmentation unit that segments a video frame into coding blocks;

a rate control unit that receives a specified compression ratio and provides an allowable bit budget for each coding, block, wherein for each coding block the allowable bit budget (i) is a number of bits allocated for encoding the coding block, each coding block of the coding blocks being guaranteed an allocation of at least n bits, n being based on a block size of the coding blocks and a number of bits required to represent each pixel value of each color component included in the coding blocks, and (ii) is determined based on a number of bits previously utilized in another coding block, the allowable bit budget for the coding block being equal to $((n*(m+1))-B_m)$ bits, where m is a number of the coding blocks previously encoded, and $B_m$ is a number of bits utilized in encoding the m coding blocks;

a selector that receives the coding blocks and the allowable bit budget for each coding block and, for each coding block selects a respective coding mode from a plurality of coding modes based on the allowable bit budget; and an encoder that (i) receives each coding block, the coding mode for each coding block, and the allowable bit budget for each coding block, (ii) provides a number of bits utilized to encode each coding block to the rate control unit, and (iii) processes a compressed bit stream, wherein the allowable bit budget among the coding blocks varies such that the video frame maintains a specified compression ratio.

17. The system of claim 16, wherein the encoder selectively utilizes the allowable bit budget according to the coding mode.

18. The system of claim 16, wherein the selector evaluates whether a number of new color representations, not currently in a global pallet table of colors, can be added to the global pallet table.

19. The system of claim 16, wherein the plurality of coding modes includes a wavelet transform mode in which each color plane of a coding block is encoded separately.

* * * * *